United States Patent Office 2,698,825
Patented Jan. 4, 1955

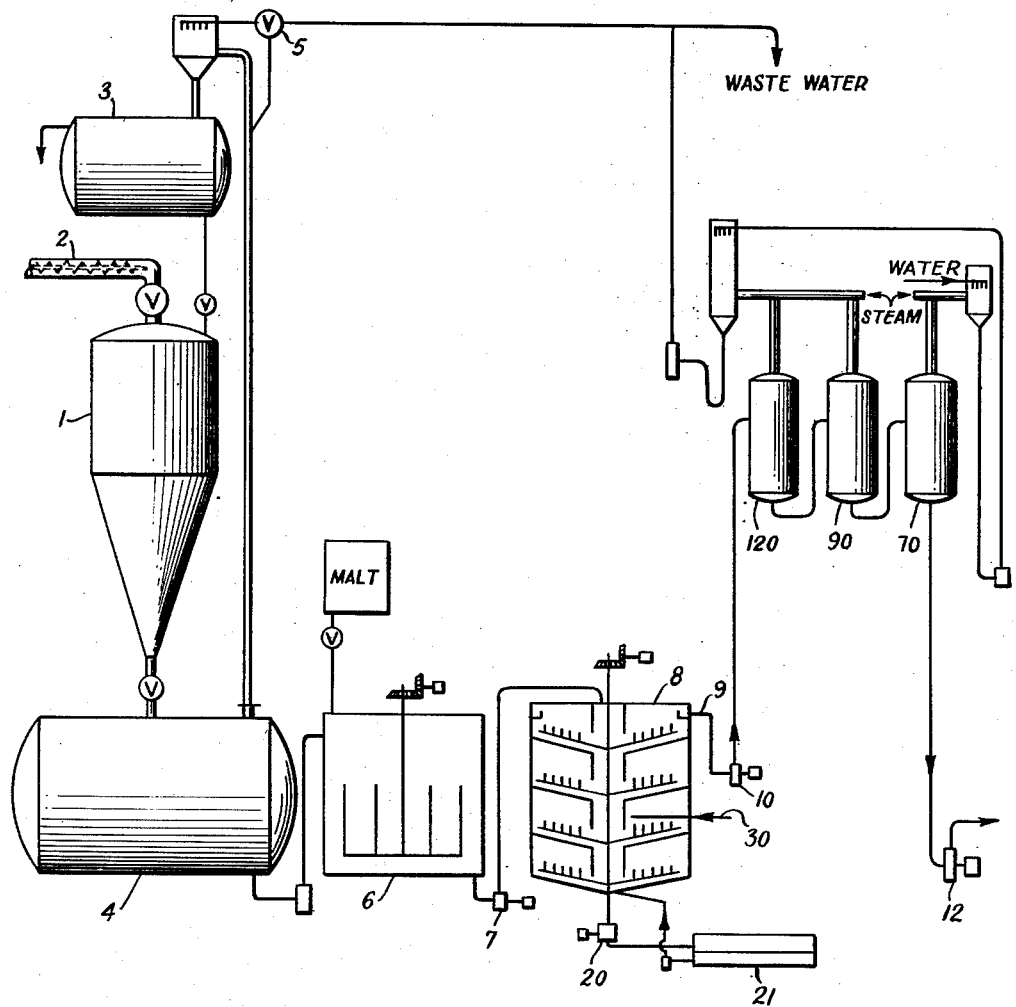

2,698,825

CLEAR SOLUTIONS OF CARBOHYDRATES

Edward M. Frankel, Nyack, N. Y.

Application August 27, 1949, Serial No. 112,808

11 Claims. (Cl. 195—4)

This invention relates to a novel method of producing a clear solution of fermentable carbohydrates from grains, such as corn, rye and the like; and separating the solution of the fermentable carbohydrates so obtained from the insoluble portions of the grains such as the protein, fiber, oil, etc., thereof, without the use of the filtration equipment commonly employed in the art.

Such solutions can be used for fermentation to produce ethyl alcohol, butyl alcohol, acetone, yeast culture, maltose syrup, lactic acid, citric acid, antibiotics, etc.

In the usual process employed for the manufacture of alcohol, American whiskey, etc., from whole grain, no separation of soluble carbohydrate thereof from the insoluble residues is made prior to the fermentation, although it is commonly the practice to effect such separation in the manufacture of beer and Scotch whiskey, by means of filtration techniques.

There is considerable advantage to be derived from making such a separation in the manufacture of alcohol and other spirits, but the problems arising from the use of conventional plate and frame filters, drum filters or false bottom mash tubs, has been so great that the art has not evolved along these lines.

My novel method hereinafter described, makes this possible within practicable economic limits with regard to capital and operating costs. After fermentation and distillation, the residue from the convention alcohol production process presents a difficult and costly recovery problem in order to avoid stream pollution and its sequelae. With the process herein disclosed, the fermentation of my novel clear solution permits the easy separation of yeast (suitable for re-use if desired) by centrifugal action, leaving a clear beer that is easily distilled and gives rise to a clear stillage with so little dissolved solids that it may be discarded without serious stream pollution, or may be re-used in the initial stages of the process in substitution of an equal amount of water. The residual liquid from the distillation contains an amount of glycerine equal to about three (3)%, of the original fermentable sugars, and if these liquids are evaporated, a valuable by-product of fermentation, ordinarily lost, may be recovered. My novel process thus makes possible recovery of the solids in a desirable form, and recovery of yeast and glycerol without interference with the main function of the production of spirits. Another advantage of the process is that the wort for fermentation can be made sterile so that no side reactions occur, as for example, lactic and acetic acid fermentations which consume fermentable sugars that should be converted into alcohol, and which also cause ester formations that lead to unwanted impurities in the raw spirit.

I have discovered that the gist of my invention which makes the objects and advantages thereof achievable, resides in the maintenance of the proteins of the grain as a floc and the fats or oils thereof in any non-emulsified state. In the process heretofore used the mixing of the cooked grain slurry and diastatic enzyme preparation invariably results in the formation of an exceedingly stubborn emulsion which defies economical filtration.

I have discovered that it is possible to carry out the mixing of the cooked grain slurry with the diastatic enzyme preparation in such a way as to maintain the protein as a floc and the fats or oils in a non-emulsified state. With such avoidance of the formation of the customary stubborn emulsion, the floc may be effectively separated from the liquid to obtain a clarified solution of the fermentable carbohydrates. Accordingly, the heart of this invention resides in the mixing of the cooked grain slurry with the diastatic enzyme preparation so that emulsification is avoided and the protein maintained in a non-floced state.

The objects, purposes, features, characteristics, and advantages of this present invention will be in part apparent or obvious, and in part pointed out as the description progresses. In describing the invention in detail, reference will be made in part to the accompanying drawing in which the figure, "a diagrammatic" representation of a plant lay-out, adapted for carrying my process into operation.

Referring to the drawing, whole, unground corn, milo, rye, potatoes, or other carbohydrate-bearing material is fed into cooker 1 through conveyer 2 together with the correct amount of hot water from tank 3 in which heated water from other parts of the process is accumulated, the same being heated to nearly the boiling point by condensing the vapors from the previous discharge of a cooker charge. The cooking of the grain is made at about 300° F. by injecting live steam at the base of the cooker with or without the circulation of the liquid. After the cook has proceeded to the temperature selected for the time required by the raw material employed, the charge is blown out into receiver 4, where it is cooled by evaporation in vacuum to about 200° F. by condensation of the evolved vapor with a regulated stream of water controlled by the pressure controller valve 5, so as to maintain the desired vacuum in receiver 4. From receiver 4 the cooked grain slurry is pumped to mash tub 6 where a slurry of malt or other diastatic preparation such as mold, bran, etc., in cold water is being slowly agitated. I have found that this is a critical point in the operation. I have found that if care is taken to operate the agitator slowly enough, no breaking up of the protein floc or dispersal of fat and the emulsification occurs. The rate of agitation depends on the form of the agitator, a gate type mixer being preferred. I have noted that when an agitator is running too rapidly its dispersion force can be overcome by shortening of the blades and removal of some parts of the agitator plants, until the desired condition is achieved. Also contributing to the success of this process is the fact that the total quantity of diastatic enzyme is present from the beginning of the mashing so that by mass action the reaction is accelerated and the formation of non-colloidal sugars instead of higher dextrins, etc., occurs. The low concentration of higher carbohydrates is thus insufficient for the protective colloidal action thereof on the proteins and fats so that floc formation proceeds readily, and a clear liquid separates easily and quickly from the insolubles and suspended flocs.

If a cold slurry or infusion of diastatic enzyme preparation is in the mash tube while the correct amount of cooked grain slurry is added thereto, and the mixture slowly agitated at a temperature of not over 150° F., then a suspension of solids in sugar solution is obtained that will separate to yield a clear supernatant liquor. The suspension thus obtained is now pumped by a slow-acting piston pump 7 into the central inlet of a multi-tray washing thickener 8. The mixture separates into a clear liquid overflowing through line 9 into receiver 10 while a magma of residual solids is removed by diaphragm pumps 20 over a vibrating screen 21 to remove the bulk of the liquid. The liquid from vibrating screen 21 is returned to the base of the thickener 8 with such amount of water as is needed for substantial removal of the solubles. The screen solids are pressed and dried in the conventional manner and are useful for human or animal nutrition, manufacture of plastics, adhesives, etc.

The clear liquid overflowing through line 9 is pumped by means of pump 10 through a cooling device such as a double pipe cooler, although for the best practice of this invention an evaporative cooler of the usual design is preferred. This preference is based on the fact that it is desirable to add about 1/10 (0.10%) percent of toluene or other volatile bactericide in the agitator so as to keep the contents of the washing thickener 8 sterile. If toluene is added it will be evaporated in the evaporative coolers 120, 90, and 70 and thus leave the wort discharged through pump 12 to the fermentation sterile, but free of any preservative that would impede the action of the yeast.

After fermentation is completed, the fermented wort is centrifuged to remove the sustained yeast and the clarified liquid is distilled to remove alcohol using a stripping still with a closed steam coil or calandria at the base, thus avoiding dilution of the stillage and thereby effecting a concentration of the solution. The stillage is returned in part to a lower stage of the washing thickener 8 by line 30, previously having been cooled to the temperature of the thickener and the rest is evaporated to recover a concentrated solution of glycerine from which concentrate it may be recovered in purified form by solvent extraction and/or distillation in vacuo. The final evaporation may be conducted at elevated pressure and the vapor used to heat the still.

While the general specification given above relates mainly to the preparation of a wort for alcoholic fermentation, such a clarified and sterilized wort may be used for other fermentations or the preparation of maltose syrup in which serious filtration problems are usually encountered.

It will be understood that the foregoing description of the invention is merely illustrative of the principles thereof; and accordingly, that the appended claims are to be construed as defining the invention within the full spirit and scope thereof.

I claim:

1. Method of producing clear solutions of carbohydrates for fermentation which comprises cooking cereal grains whereby an aqueous suspension of carbohydrates accompanied by proteins and such other non-carbohydrate substances as are present in the grain is obtained, adding a charge of the said aqueous suspension thus obtained to an aqueous suspension of a diastatic enzyme, the enzyme being present in the total quantity required for diastatic action on the carbohydrate in the charge to convert the carbohydrate into fermentable form, slowly agitating the mixture of the charge and the enzyme until the diastatic action is completed, the rate of agitation being of the order sufficient to maintain the charge and the enzyme in thorough mixture, settling the protein flock, and removing the supernatant solution of the carbohydrates after settlement of the flock.

2. Method of producing clear solutions of carbohydrates for fermentation which comprises cooking cereal grains whereby an aqueous suspension of carbohydrates accompanied by proteins and such other non-carbohydrate substances as are present in the grain is obtained, adding a charge of said aqueous suspension of the carbohydrates to an aqueous suspension of a diastatic enzyme, the enzyme being present in the total quantity required for diastatic action on the carbohydrates present in the charge to convert said carbohydrates into fermentable form, slowly agitating the mixture of the charge and the enzyme until the diastatic action is completed, the rate of agitation being of the order sufficient to maintain the carbohydrate and the enzyme thoroughly mixed, passing said mixture through a zone wherein the protein flock is withheld, and collecting the aqueous solution of the carbohydrates thus stripped of the protein flock.

3. Method in accordance with claim 1 wherein the cereal grain is cooked at a temperature of about 300° F.

4. Method in accordance with claim 3 wherein the aqueous suspension of the carbohydrates is cooked to about 200° F.

5. Method in accordance with claim 4 wherein the aqueous suspension of carbohydrates and the aqueous suspension of the diastatic enzyme are mixed at a temperature not exceeding 150° F.

6. Method in accordance with claim 2 including the fermentation of the clear solution of the fermentable carbohydrates followed by the distillation thereof to remove the volatile products formed during such fermentation.

7. Method in accordance with claim 6 wherein the clear aqueous suspension of the carbohydrates is subjected to alcoholic fermentation; and removing the alcohol thus produced.

8. Method in accordance with claim 7 followed by the recovery of glycerine from the residue remaining after the removal of the alcohol.

9. Method of producing clear solutions of carbohydrates for fermentation which comprises adding a charge of an aqueous suspension of carbohydrates accompanied by proteins, fats, and such other non-carbohydrate substances as are present in the source material of the carbohydrates to an aqueous suspension of a diastatic enzyme, the aforesaid source material being cereal grains, the diastatic enzyme being present in the total quantity required for the diastatic action on the carbohydrate in the charge, slowly agitating said mixture of the charge and the enzyme until the diastatic action is completed, the rate of agitation being such as to effectuate the complete mixture of the aforesaid carbohydrate of the diastatic enzyme, maintaining the mass until the protein floc settles, and after such settlement removing the supernatant solution of the fermentable carbohydrate.

10. Method of producing clear solutions of carbohydrates for fermentation which comprises adding a charge of an aqueous suspension of carbohydrates accompanied by proteins, fats, and such other non-carbohydrate substances as are present in the source material of the carbohydrates to an aqueous suspension of a diastatic enzyme, the aforesaid source material being cereal grains, the diastatic enzyme being present in the total quantity required for the diastatic action which will convert all of the carbohydrate in said charge into fermentable form, and slowly agitating said mixture of the charge and the enzyme until the diastatic action is completed, the rate of agitation being such as to effectuate the complete mixture of the aforesaid carbohydrate and the diastatic enzyme, passing said mixture through a zone wherein the protein floc is withheld, and collecting the aqueous solution of the fermentable carbohydrates thus stripped of the protein floc.

11. Method of producing clear solutions of carbohydrates for fermentation which comprises adding a charge of an aqueous suspension of carbohydrates accompanied by proteins, fats, and such other non-carbohydrate substances as are present in the source material of the carbohydrates to an aqueous suspension of a diastatic enzyme, the aforesaid source material being cereal grains, the enzyme being present in the total quantity required for diastatic action on the carbohydrate in the charge, the quantity of the enzyme present being sufficient to convert the carbohydrate into fermentable form, slowly agitating said mixture of the charge and the enzyme until the diastatic action aforesaid is complete, adding a volatile bactericide to said mixture, the amount of the bactericide being sufficient to achieve bacteristasis, passing said mixture through a zone wherein the protein floc is withheld, and collecting the aqueous solution of the fermentable carbohydrates thus stripped of the protein floc.

References Cited in the file of this patent

UNITED STATES PATENTS

| Number | Name | Date |
| --- | --- | --- |
| 710,396 | Schmitz | Sept. 30, 1902 |
| 1,166,599 | Keller | Jan. 4, 1916 |
| 2,222,306 | Atwood | Nov. 19, 1940 |
| 2,343,706 | Reich | Mar. 7, 1944 |
| 2,375,189 | Blankmeyer et al. | May 8, 1945 |
| 2,451,510 | Pattee | Oct. 19, 1948 |